Patented Feb. 13, 1934

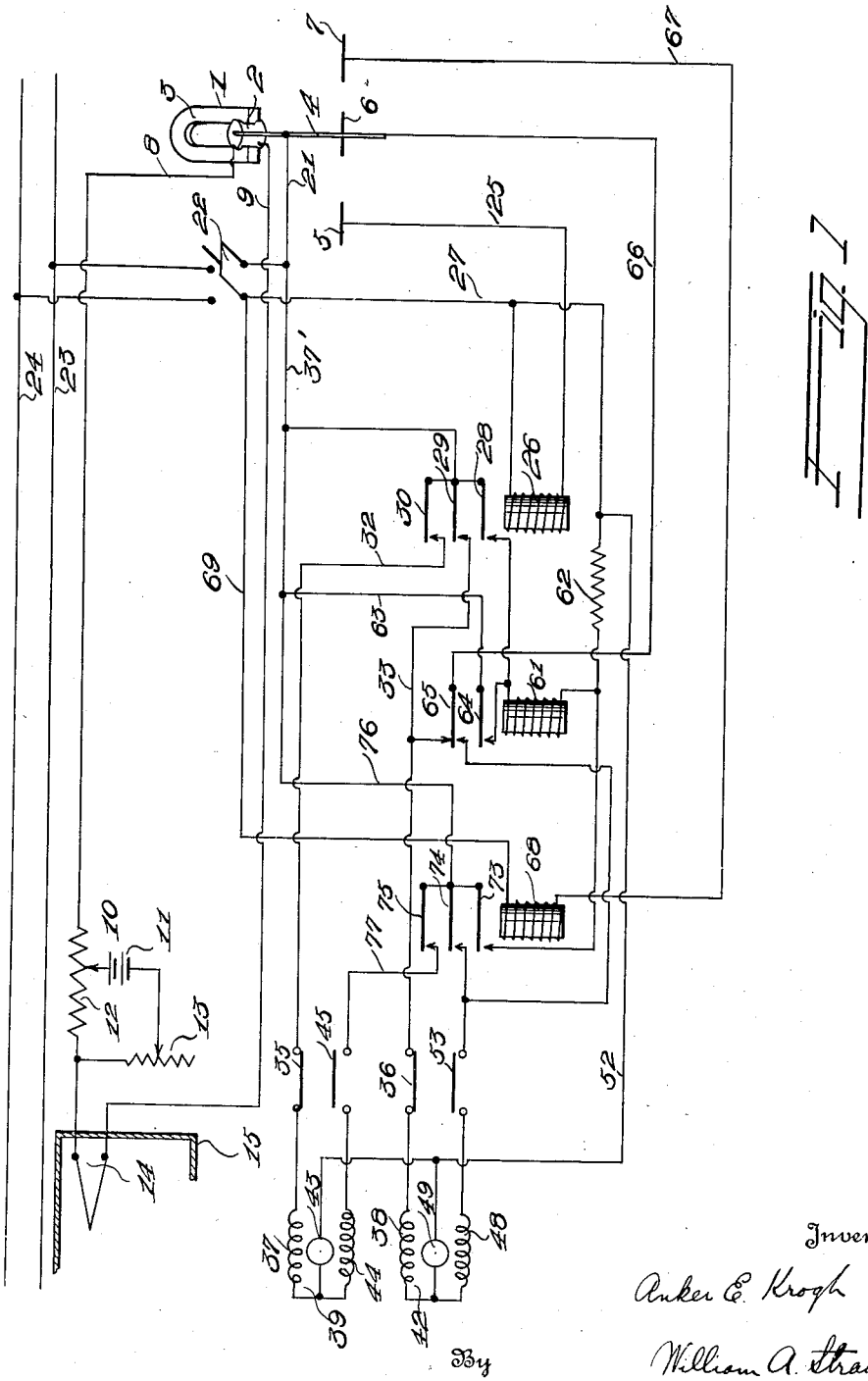

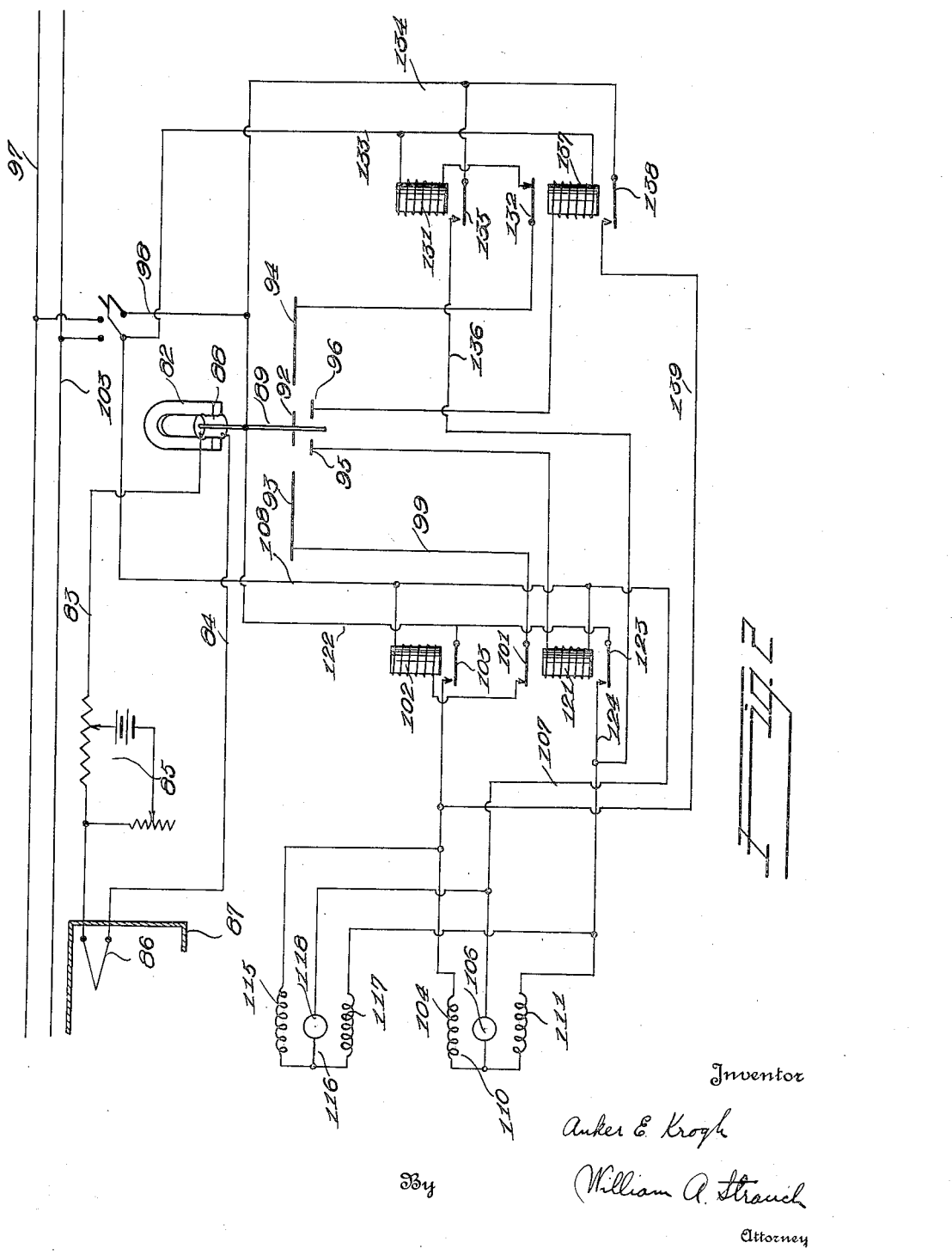

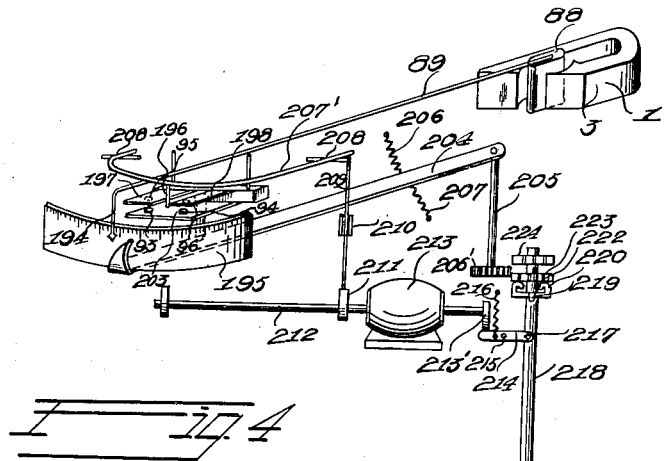

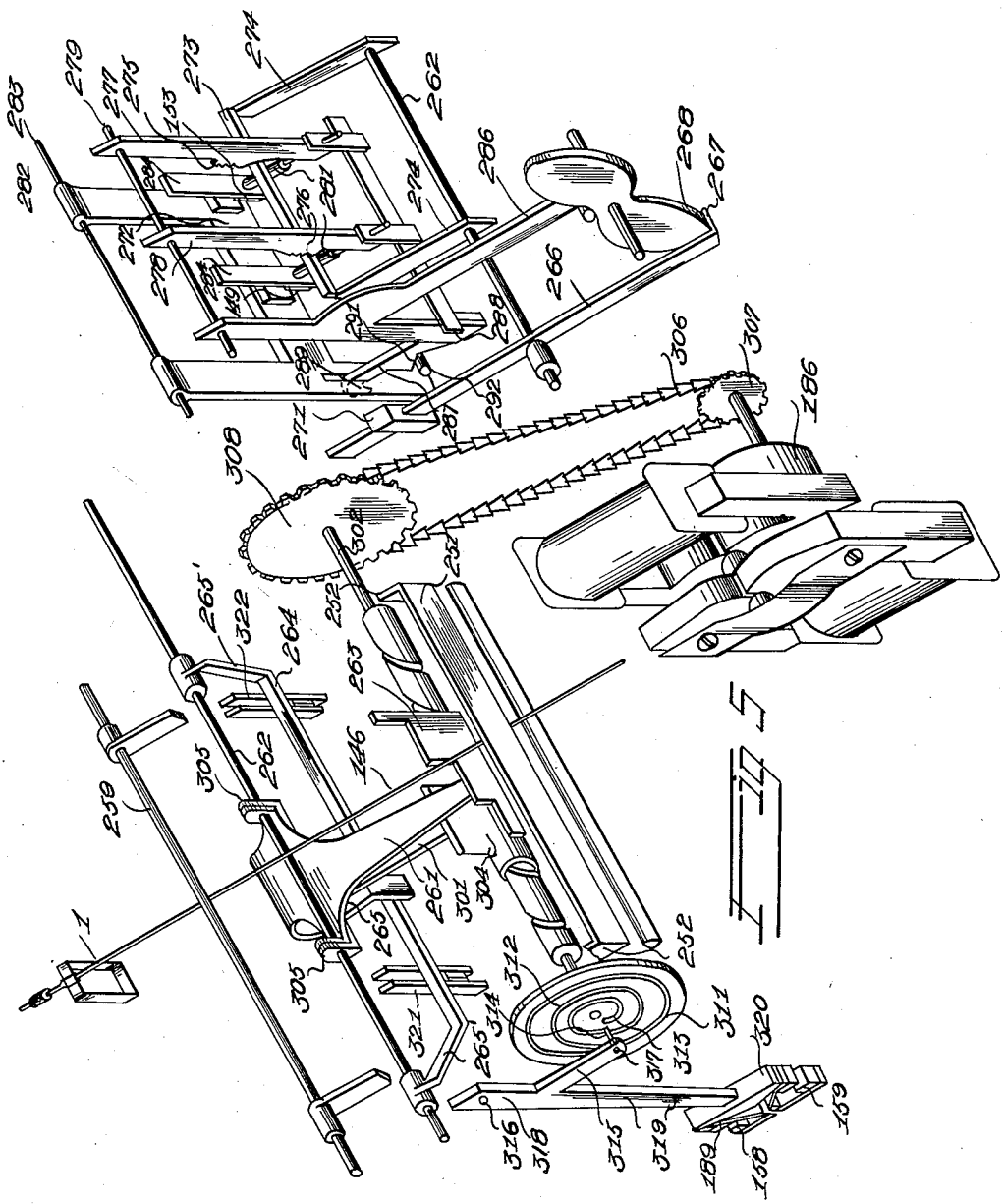

1,947,297

UNITED STATES PATENT OFFICE 1,947,297

CONTROL APPARATUS

Anker E. Krogh, Philadelphia, Pa., assignor to The Brown Instrument Company, Philadelphia, Pa., a corporation of Pennsylvania Application October 16, 1928. Serial No. 312,923

29 Claims. (Cl. 236—70)

My invention relates to apparatus for and methods of maintaining predetermined temperature, pressure or other physical conditions. More particularly, my invention relates to control apparatus and methods in which periodically operating members function under control of a delicate galvanometer for maintaining a predetermined physical condition.

By way of example, in controlling a temperature to a predetermined value it is the practice to employ temperature responsive devices such as thermocouples, which generate currents of relatively weak amplitude, and to employ delicate galvanometers which require very little power to operate. In order that the very delicate galvanometer pointer may control the comparatively large values of current which are necessary to operate valves or other heat controlling means, the usual practice is, as is well known by those skilled in the art, to employ periodically operating mechanism which at fixed intervals engages the galvanometer needle and firmly clamps it in deflected positions. This periodic mechanism acts as a mechanical amplifier and by the engagement of the needle controls a comparatively large current supply in accordance with the position of the galvanometer needle. In this type of apparatus, the galvanometer circuit is such that at a predetermined temperature, the pointer remains on its normal position and as the mechanism operates periodically to engage it, no control operations occur.

When, however, the temperature being controlled deviates from the predetermined value, the galvanometer pointer will be deflected from its normal position in accordance with the direction and extent of deviation, and as the periodic member engages the pointer a variation in the rate of heat supply is caused which will tend to bring the furnace temperature back to the normal value. For example, if the temperature drops below its predetermined value, the engagement of the pointer with the periodic member results in an increase in the rate of heat supply to restore the temperature to normal. When the galvanometer pointer begins to return to normal the rate of heat supply may be sufficient to bring the temperature back to the desired predetermined value. In such an event it is undesirable to further increase the rate of fuel supply, but in practice, due to the temperature lag, the pointer is still in deflected position, although moving toward normal, and when engaged by the periodic mechanism will again operate to open the fuel valve or to increase the heat supply still further. As a result the rate of heat supply will exceed the amount necessary to maintain the temperature and when the temperature has finally returned to the predetermined value, it will continue to rise and deviate again from the desired value. The galvanometer pointer is thereupon deflected in the opposite direction from the normal from that described above and the engagement of the periodic mechanism with the pointer operates to decrease the rate of fuel supply. As a result of the engagement of the periodic mechanism with the pointer in deflected position, the rate of heat supply is reduced sufficiently to cause the temperature to begin to drop and the galvanometer needle moves to its normal position. While the needle is returning, however, the periodic mechanism continues to engage it tending to further decrease the rate of fuel supply notwithstanding the fact that the movement of the pointer towards normal indicates that the fuel supply has been cut down sufficiently to restore the temperature to normal. When, therefore, the galvanometer needle has finally returned to its normal position, the temperature having been restored to its predetermined value, the rate of fuel supply will have been reduced to such a low value that the temperature will continue to drop and the above described cycle of operation is then repeated and what is termed in the art as "hunting" occurs.

Heretofore it was thought that hunting is due entirely to the temperature inertia or lag in the furnace and due to that fact that furnace temperature fails to respond instantly to a change in heat supply, while the galvanometer responds to the instantaneous temperature values. I have discovered, however, that hunting may be attributed not only to this lag factor, which is admittedly important, but also in substantial part to the fact that in operation, the control apparatus heretofore employed failed to take into account that the heat supply necessary to maintain a predetermined temperature is different from the heat supply necessary to restore the temperature to the predetermined value after a deviation.

The rate of heat supply necessary for proper temperature control should be first sufficient to return the temperature to the desired predetermined value, and then as the desired value is approached, should be changed to the rate necessary to maintain the temperature at the desired value. It is, accordingly, necessary when a deviation in temperature occurs, to change the heat sufficiently to restore the temperature with desirable rapidity to the necessary extent and when such a heat supply change is made, it is more than enough to maintain the temperature at the desired value. When the heat supply is changed sufficiently in practice to cause the temperature to begin to restore with desirable rapidity, I have found that the rate of heat supply has already been changed more than is necessary to maintain the temperature at a predetermined value, and before the predetermined temperature is reached, it is necessary to change the rate of heat supply to a different value to hold the temperature at the desired value.

I have found that if the change in the rate of fuel or heat supply in response to the deviation is determined, not only by the extent of departure of the temperature from normal, but also by the direction of temperature drift a considerably improved and novel control is provided. I have discovered that in order to function most effectively, the control apparatus should respond not only in accordance with the extent of departure of the temperature from a predetermined value as has been accomplished heretofore in control apparatus, but also in accordance with the direction of movement or drift of the temperature with relation to the desired value. My improved controls hereinafter set forth are accordingly arranged to function so that when the temperature is below a predetermined temperature, they will increase the heat supply while the temperature is moving away from normal, and decrease the rate of heat supply properly when the temperature is moving towards and before it reaches the normal value; and when the temperature is above the predetermined value, will function to decrease the rate of heat supply until the temperature begins to restore to normal when the rate of heat supply is increased properly before the normal value is reached. My improved control apparatus accordingly responds to both the extent of variation of temperature from a predetermined value, and the direction of movement of the temperature at the time of the correction and when properly adjusted will practically eliminate hunting.

Accordingly, it is a primary object of my invention to provide means for and methods of controlling physical conditions variably in accordance with the extent and direction of movement or drift from or to a predetermined value.

Another object of my invention is to provide novel apparatus for, and novel methods of preventing hunting in controlling temperatures or other physical conditions to predetermined values.

A further object of my invention is to provide double motor valve control mechanisms for controlling temperatures in a manner to minimize hunting.

Other objects of my invention together with the above, will appear in the following detailed description and are defined in the appended claims.

As shown in the drawings, Fig. 1 is a diagrammatic view of the circuits and apparatus in a preferred embodiment of my invention.

Figure 2 is a diagrammatic view of the circuits and apparatus employed in a modified form of my invention employing a single motor.

Figure 3 is a view of a modified form of the control apparatus and circuits associated therewith.

Figure 4 is a view of the control device useful in carrying out the invention of the modification shown in Fig. 2.

Figure 5 is a perspective view showing a control apparatus useful in connection with the modification shown in Fig. 3.

Referring to Figure 1, a contacting control galvanometer 1 is provided comprising a movable coil 2, suspended between the poles of a permanent magnet 3. Associated with the coil 2 is a pointer 4 preferably provided with a contact engaging portion adapted to swing over and engage a low contact 5, neutral contact 6 and high contact 7, the electrical connections of which are to be described in detail hereinafter. Armature coil 2 is connected by means of conductors 8 and 9 through a potentiometer 10 comprising a battery 11 and adjustable resistances 12 and 13 to the thermocouple or any other well known temperature responsive device 14 located in a furnace or any other device 15 which is to be maintained at a predetermined temperature.

The potentiometer 10 is so adjusted that normally when the temperature in the furnace is at a predetermined value there is no current flow in the galvanometer circuit, and the pointer 4 is maintained in a neutral position just above the contact 6. When the temperature, however, drops to a value below the predetermined value, the resultant current in the galvanometer circuit is such that the pointer 4 is deflected to the left over contact 5. If, on the other hand, the temperature rises above a predetermined value, the galvanometer needle 4 is deflected to the right over contact 7.

As described above, the galvanometer pointer 4 is in working cooperation with contacts 5 to 7. When the pointer is deflected from its neutral position and assumes a position over any one of these contacts, it is periodically clamped to engagement with the contact to which it has been deflected, as will be described in detail hereinafter.

The pointer 4 is connected by means of conductor 21 and switch 22 to one side 23 of the power circuit 23, 24. Low contact 5 is connected by means of conductor 25 to the winding of the relay 26 which completes its circuit over the conductor 27 to the opposite side of the power circuit at 24. Relay 26 is energized over the circuit traced above including the pointer 4 whenever the galvanometer pointer 4 is deflected to the left and engages the contact 5. Upon energization, the relay operates its three armatures 28, 29 and 30, which are normally in their disengaged back position, into engagement with their front contacts. The front contacts of armatures 30 and 29 are connected over conductors 32 and 33 and the limit switches 35 and 36 to windings 37 and 38 of motors 39 and 42 respectively. Motor 39 known in the art as the floating motor comprises, in addition to the field winding 37, an armature winding 43 and a second field winding 44. A current flow through field winding 37 causes the motor to rotate in one direction while current flowing through the second field winding 44 produces a motor rotation in the opposite direction. The rotating armature of motor 39 is mechanically connected to a fuel supply valve (not shown), controlling the supply of fuel for heating the furnace 15. Current through winding 37 produces a rotation of fuel valve such as to increase the rate of fuel supply to the furnace 15 while current through winding 44 produces a fuel valve rotation which decreases the fuel supply.

Limit switches 35 and 45 are connected to the fuel supply valve to prevent movement of the valves beyond fixed limits in a manner well known in the art. After the valve has been moved to predetermined maximum opening the limit switch 35 moves from engagement with its contacts and functions to open the circuit of the winding 37. When on the other hand the fuel supply valve has been closed through a predetermined angle as the result of the movement of motor 39 produced by current flowing through the winding 44 as will be described in detail hereinafter, the limit switch 45 moves from in engagement with its contacts and opens the circuit of the winding 44. The limit switches 35 and 45 are normally closed and serve only to prevent the motor 39 from traveling beyond those positions corresponding to the maximum or minimum desirable open or closed position of the valve or other control device driven thereby.

In addition to the floating motor 39, the fuel supply valve is also controlled by an initial motor 42, comprising field windings 38 and 48 and the armature 49. Currents flowing through the field winding 38 will cause a motor rotation such that the valve opens, increasing the rate of fuel supply, whereas current flowing through the winding 48 rotates the motor and the valve in such a direction as to decrease the rate of fuel supply as described in detail hereinafter. In addition, the motor is also supplied with limit switches 36 and 53, the former functioning after the fuel valve has been moved through a predetermined angle to open the circuit of winding 38 while the switch 53 simultaneously prepares a circuit for winding 48. Similarly the limit switch 53 functions after the valve has been moved through a predetermined angle to open the circuit of the field winding preventing further closing of the valve 48. As will be described fully hereinafter, motor 42 controls the fuel valve between wide limits and motor 39 varies these limits.

As explained above, when the temperature drops, the current flow in the galvanometer circuit is such that the pointer 4 is deflected to the left and the periodically operated table causes contact 5 and pointer 4 to engage completing a circuit for relay 26 from power line 23 over switch 22, conductor 21, pointer 4, contact 5, conductor 25, relay 26, and conductor 27 to power line 24. As a result of the energization of relay 26, armature 30 engages its front contact and an energizing circuit is completed for the field winding 37 of motor 39, from the side 23 of the power line through the switch 22 over the conductor 37' through armature 30 and its front contact, the limit switch 35, field winding 37, armature winding 43, and conductor 52 and 27 to the opposite side of the power line 24. The motor 39 is rotated a predetermined amount increasing the opening of the fuel valve and therefore the rate of fuel supply. The extent of operation of the motor and fuel valve depends upon the period during which the motor circuit is held closed by armature 30. This in turn depends upon the period during which relay 26 remains energized which is determined by the period of engagement between pointer 4 and contact 5. Various types of contact operating mechanism well known in the art are available which are or can be designed so that the period of engagement of the pointer 4 with any of the contacts 5, 6 and 7 may be any function of the deflection of the pointer 4 that is desired. Usually the mechanism for effecting contact between the pointer 4 and the contacts associated therewith is so constructed that the period of engagement of the pointer with the contacts is proportional to the extent of departure of the pointer from normal.

As a further result of the energization of relay 26, and the operation of armature 29 into engagement with its front contact as described above, a circuit for field winding 38, is completed from the side 23 of the power circuit over conductor 37'; armature 29, and its front contact, conductor 33, limit switch 36, field winding 38, armature winding 49 and conductors 52 and 27 to the opposite side of power circuit 24. The motor 42 is thus operated to increase the valve opening and the rate of fuel supply simultaneously with the operation of the motor 39. Initial motor 42 upon a predetermined operation thereof as described above moves the limit switch 36 so as to open the circuit of winding 38 and limit switch 53 closes preparing a circuit for field winding 48 for the purpose to be described in detail hereinafter.

A further result of the energization of relay 26 is to complete an energizing circuit for the relay 61 from one side of the power circuit 23 over the switch 22, conductor 37', armature 28 and its front contact through the winding 61, and conductor 27 to the opposite side of the power circuit over conductor 24. Relay 61 is energized and completes a locking circuit for itself from power conductor 23 over conductor 37', conductor 63, armature 64 and its front contact through the winding of relay 61 and the return circuit as traced above through resistance 62 to power conductor 24. As will be described in detail hereinafter, this locking circuit is later short circuited on a circuit including resistance 62 which acts to prevent too severe a short circuit.

It will be noted from the description that follows that the relay 61 is operated differently depending upon whether the galvanometer needle is returning to normal from a value below a predetermined value or from a value above a predetermined value and thereby distinguishes these two operations. The control of the two motors 39 and 42 is in turn determined by the direction of movement of the pointer 4.

In addition to armature 64 the relay 61 is provided with an armature 65 which has both a front and back contact. As a result of the energization of relay 61, armature 65 engages its front contact and a further point in the circuit for the winding 48 is closed. As will be clear however, this circuit is not completed at this time due to the fact that the galvanometer needle is deflected inasmuch as the completed circuit must include the neutral contact 6 and pointer 4.

No further operations of the initial motor 42 occur at this time inasmuch as the circuit for winding 38 is opened by limit switch 36 and the circuit for winding 48 is prepared over the armature 65 as described above and depends for its completion upon the return of pointer 4 to neutral.

As the galvanometer needle 4, however, in its deflected position, continues to engage contact 5, the relay 26 continues to energize to complete the circuit for the motor 39 through the field winding 37 thereby further opening the fuel valve and increasing the rate of fuel supply to the furnace 15. After one or more of these operations, fuel is being supplied to the furnace at such a rate that the temperature starts to rise to normal.

As explained fully above, the amount of fuel necessary to produce a rise in the furnace temperature is equal to the amount of fuel necessary to maintain the furnace at the predetermined temperature plus the additional amount of fuel necessary to increase the temperature from below the value to the value. Accordingly, at this time the rate of fuel supply is more than enough to maintain the temperature at a predetermined value and it will accordingly be necessary to provide means for decreasing the rate or fuel supply when the predetermined temperature has been reached.

In the present instance, this is accomplished by decreasing the rate of fuel supply a suitable time before the temperature has been reached. As the galvanometer pointer 4 swings towards its normal and the temperature reaches its predetermined value, it will be above the neutral contact 6 when the correct temperature is reached. Pointer 4 and contact 6 will thereupon engage under control of the periodically operated table. As a result of the engagement of pointer 4 and contact 6 the circuit for winding 48 is completed from the side 23 of the power circuit over the switch 22, conductor 21, galvanometer pointer 4, neutral contact 6, conductor 66, armature 65 and its front contact through the limit switch 53, field winding 48 and armature winding 49 and conductors 52 and 27 and to the opposite side of the power line 24. As described above, the current flow through the winding 48 will rotate the motor in the direction to decrease the fuel valve opening and therefore the rate of fuel supply. As in the case described above, the current flow through the winding 48 is sufficient to cause the motor 42 to rotate its complete distance opening the limit switch 53 and again closing the limit switch 36 preparing the circuit for winding 38. In this manner when the temperature has reached a predetermined value the amount of fuel supply is quickly reduced by the amount of variation produced by the initial motor 42 in the first instance when it was operated to increase the fuel supply.

As will now be clear from the above description when a drop in temperature occurs both the floating motor 39 and the initial motor 42 operate to increase the rate of fuel supply. This increase is divided into two components, the first being the amount necessary to maintain the temperature at the normal value and the second being the amount necessary to raise the temperature from below the normal to the normal. The motor 42 is operated in the reverse direction to cancel the component of adjustment made by that motor, when it first departed from normal. The reverse operation of motor 42 is effected before the pointer reaches normal because of the finite width of the center contact which results in making contact between the pointer 4 and the center contact 6 before the normal position of the instrument is reached. Accordingly only the first component of adjustment made by the motor 39 remains and there will then be no tendency for the furnace temperature to rise above the predetermined value. The amount of fuel supply now being admitted to the furnace is greater than was originally supplied when the temperature drop occurred due to the operations of the motor 39 but this is obviously necessary inasmuch as the drop in temperature indicates that some change has occurred such as quality of fuel, quantity of treated material and so forth calling for an increase in the rate of fuel supply to maintain the predetermined temperature.

If now the temperature again drops below the predetermined value due to the fact that the motor 42 by its operation when the galvanometer needle engaged neutral contact 6, reduced the rate of fuel supply to such an extent that the temperature cannot be maintained at the predetermined value, the galvanometer upon deflection will again energize the relay 26 over the circuits traced above to again complete the circuit for the field winding 37 of the motor 39 and the field winding 38 of the motor 42 and these two motors again operate to increase the rate of fuel supply. A short time before the temperature restores to the predetermined value, that is, when the galvanometer pointer first engages the neutral contact 6, the circuit traced above for the motor 42 through the winding 48 is again completed over the limit switch 53 which now is again in engagement with its contacts and the armature 65 and its front contact, the relay 61, it will be recalled, having been locked in energized condition during all this operation. As a result the rate of fuel supply is again instantly reduced a short time before normal temperature is reached in order to prevent the temperature from over shooting.

The reverse operations take place when the temperature rises above a predetermined value. In that case the galvanometer needle 4 is deflected to the right and during the periodic table operations engages the contact 7. As a result of the engagement of pointer 4 with the contact 7 a circuit is completed for the relay 68 from the side 23 of the power circuit over switch 22, conductor 21, galvanometer pointer 4, contact 7, over the conductor 67, winding of relay 68 and over the conductor 69 to the opposite side of the power circuit 24. Upon the energization of the relay 68, armatures 73, 74 and 75 close their respective front contacts. Armature 75 in engagement with its front contact completes an energizing circuit for the motor 39 through the field winding 44 from the side 23 of the power circuit over the switch 22, conductors 37' and 76, armature 75 and its front contact, conductor 77 through the limit switch 45 in engagement with its contacts, field winding 44 and armature winding 43 and conductors 52 and 27 to the opposite side of the power circuit at 24. The motor 39 is thereupon rotated in a direction to decrease the valve opening and accordingly decrease the rate of fuel supply to the furnace 15. Simultaneously a circuit may be completed for the field winding 48 of motor 42 over the armature 74, the circuit being completed from the power side 23, switch 22, conductors 37' and 76 to the armature 74 and its front contact, limit switch 53 if this switch is at this time closed, and through the field winding 48 and armature winding 49 over the return circuit as has been traced above. Motor 42 operates with motor 39 to close the fuel valve and as described above rotates to its complete limit opening the limit switch 53 and closing the limit switch 36 to prepare a circuit for the motor field winding 38. A by-passing circuit for the locking circuit of the relay circuit 61 which it will be recalled is now locked over a circuit including conductors 37' and 63 and armature 64, is now completed from the conductor 37' over the conductor 76 to armature 73 and its front contact and resistance 62 to the opposite side of the power line over conductor 27. As a result the relay 61 is deenergized and its armatures drop to their back positions. Armature 65 now moves from engagement with its front contact to engagement with its back contact. A second point is thereupon completed for the prepared circuit of winding 38, the completion of which depends upon the engagement of contact 6 by pointer 4. Galvanometer 1 while periodically completing the circuit for the field winding 44 over the armature 75 and its front contact as the pointer periodically engages contact 7, will have no further effect on the initial motor 42 as the circuit for the field winding 48 is now opened at the limit switch 53 and the completion of the circuit for field winding 38 depends on the engagement of pointer 4 and contact 6. Further operations of the field winding 44 over the armature 75 as described above continue to further close the fuel supply valve, thereby further decreasing the rate of fuel supply to the furnace 15.

When the rate of fuel supply has been cut down sufficiently, the temperature of the furnace begins to drop. As has been described in detail above, however, the amount of fuel supply necessary to obtain this condition must be less than the amount of fuel necessary to maintain the furnace at the predetermined value, and provision must therefore be made to increase the rate of fuel supply if the temperature is to be maintained at the predetermined value when the temperature is reached. In the present case, this is accomplished a short time before the galvanometer pointer 4 returns to its neutral position.

As has been pointed out in detail above, when the relay 61 was deenergized a circuit was prepared for the field winding 38 over the limit switch 36 and the armature 65 and its back contact. When now the temperature approaches normal and the galvanometer pointer 4 approaches its neutral position and first engages the contact 6 a circuit is completed from the power side 23, over switch 22, conductor 21, galvanometer pointer 4, neutral contact 6, conductor 66, armature 65 and its back contact, limit switch 36 through the field winding 38, armature winding 49 and over conductors 52 and 27 to the power line 24. Current flowing through the winding 38 rotates motor 42 so as to increase the rate of fuel supply as has been described in detail above. Simultaneously the limit switch 36 is opened and limit switch 53 closed. This increase in the fuel supply at this time is designed to be just sufficient to maintain the temperature at the predetermined value. If, however, the temperature again rises above the predetermined value as a result of the increase of fuel supply due to the operation of the motor 42, the galvanometer needle will again be deflected to the right again completing an energizing circuit for the relay 68 for operating the motor 39 to decrease the fuel valve opening. Motor 42 is also operated as will now be obvious from the above description to decrease the rate of fuel supply. A short time before the galvanometer pointer is again restored to normal, it will again complete a circuit for the field winding 38, as traced above, and again increase the rate of fuel supply in order to prevent the temperature from dropping below its predetermined normal value.

It will be clear from the above description of this apparatus that control is now accomplished not only in accordance with the extent of deflection of the galvanometer pointer operating in response to variations in temperature from normal but also in accordance with the direction of movement of the galvanometer pointer in response to the trend of temperature to and from normal; that is, whether it is moving from a high point to normal or from a low point to a normal. If the galvanometer pointer is moving from the low contact 5 to normal, contact 6, when the pointer reaches it, functions to complete the circuit for the field winding 48 as described above over the armature 65 in engagement with its front contact and in the event that the galvanometer pointer 4 is moving from its high contact 7 toward the neutral, it completes the circuit for field winding 38 for operating the motor in the opposite direction.

In the normal operation of the control system of Fig. 1, if for example the pointer 4 is on the low temperature side of the normal contact, it will not engage the high temperature contact 7 until after it has passed through the normal or center position and has made contact with the center contact 6. However, due to accidental fluctuations in the controlling variable, in this instance temperature, and also due to mechanical vibrations to which control instruments are at times subjected, it may happen that galvanometer pointer 4 while on the low temperature side of the center contact 6, may be accidentally oscillated past the center contact 6 and over high contact 7 and be brought into engagement therewith. Such accidental contact of the galvanometer pointer 4 with the high contact 7 will not operate the motor 42 because of the opened condition of the limit switch 53. The motor 39 would then be operated through one increment of adjustment in a direction the reverse of that in which it had been operating previously. Upon the return of the galvanometer pointer 4 to the low temperature side of the center contact 6, the usual sequence of operations in the usual operation of the control system will proceed as before described.

A modification of my invention is disclosed in Fig. 2. It will be noted in connection with Fig. 1 that a separate initial and floating motor is employed both controlling the fuel supply valve and each functioning in a different manner. It will be clear, however, that the same motor may if, desired, be employed for both functions. In Fig. 1, the center contact is made sufficiently wide to allow the temperature to stop its trend before it reaches the opposite control table to take care of the furnace lag. In Figure 2 an arrangement is disclosed in which a single motor is employed for performing both functions. The lag in the furnace is properly taken care of by a separate set of contacts as distinguished from the center contact in Figure 1.

In this figure a galvanometer 82, is similar to that described in connection with Figure 1, connected by means of conductors 83 and 84 through potentiometer circuit 85 to a thermocouple 86 connected in a furnace 87, the temperature of which is to be maintained at a predetermined value. The galvanometer 82 comprises a winding 88 and a pointer 89 which is deflected in accordance with the current flowing through the galvanometer winding 88. When the temperature of the furnace 87 is a predetermined value, the current flow in the circuits including conductors 83 and 84 is such as to maintain the galvanometer pointer 89 in its neutral position above the neutral contact 92. When, however, the furnace temperature drops to a value below the predetermined value the galvanometer needle is deflected to a position over the low contact 93 and if the temperature rises above the predetermined value, the galvanometer pointer is deflected to a position over the contact 94. As in the case of Figure 1, the contacts 93 and 94 are stationary. There is provided however, in addition to these stationary contacts the contacts 95 and 96 carried by a movable table which follows the galvanometer deflection in a manner to be described in detail in connection with Fig. 3. As long as the temperature remains at a predetermined value, the galvanometer pointer 89 continues to periodically engage contact 92 and no operation occurs. When, however, the galvanometer pointer 89 is deflected to the left it will engage the contact 93 as the periodic table operates and a circuit will be completed from the side 97 of the power circuit over the conductor 98, galvanometer pointer, contact 93, conductor 99, armature 101 and its back contact, through the winding of the relay 102 to the opposite side 103 of the power circuit. The relay 102 energizes to operate its armature 103 into engagement with its front contact completing an energizing circuit for the field winding 104, the circuit being completed from the side 97 of the power circuit over conductor 98, armature 103 and its front contact, winding 104 armature winding 106 conductors 107 and 108 to the side 103 of the power circuit. The motor 110 comprises the field winding 104 and field winding 111 and armature winding 106. Current through winding 104 will produce motor rotation in one direction while current in winding 111 produces a rotation in the opposite direction. As in the case of motor 39 the rotatable motor shaft is connected to the fuel valve (not shown). The motor may also be provided with limit switches (not shown).

Simultaneously with the completion of the circuit for winding 104, a circuit is completed for the field winding 115 of the motor 116. Motor 116 comprises in addition to the field winding 115, field winding 117 and the armature winding 118 connected in multiple with the motor 110. Current flowing through the field winding 115 rotates the motor in one direction while current flowing through the field winding 117 rotates the motor in the opposite direction. The motor 116 is connected to a table which carries the contacts 95 and 96 as will be described in detail in connection with Figure 3. When current flows through the field winding 115 as described above, the control table is moved and with it the contact 95, in the direction of the galvanometer pointer deflection, each operation however, moving the contact 95 a comparatively short distance. As the relay 102 is periodically energized while the galvanometer pointer 89 is in deflected position, motor 110 is operated by current flowing through the winding 104 to increase the rate of fuel supply. After one or more of these operations sufficient fuel will have been supplied to the furnace to result in a rise in temperature. As pointed out above when this condition is reached the rate of fuel supply is equal to the rate of fuel supply necessary to maintain the furnace at the predetermined temperature plus the rate of fuel supply necessary to raise the temperature back to its predetermined value. In order to prevent hunting, it will accordingly be necessary to eliminate the last mentioned component of the rate of fuel supply. In the present instance this is accomplished by means of the contact 95.

When the galvanometer pointer in response to the rise in temperature begins to swing back towards normal position, it will soon encounter the contact 95 which as described above has been moved in small increments towards the deflected galvanometer pointer. When the galvanometer pointer 89 engages the contact 95, a circuit is completed from the side 97 of the power circuit through the pointer 89 contact 95, winding of relay 121 over the conductor 108 to the side 103 of the power line. Upon the energization of relay 121, the energizing circuit for the relay 102 is opened at the armature 101 which is moved from engagement with its back contact thereby preventing relay 102 from energizing thereafter while the pointer moves toward normal. As a result the rate of fuel supply will not be increased although the galvanometer needle is still in its deflected position, and will continue to engage contact 93.

It will be recalled however, that when the temperature begins to rise, the increases in the rate of fuel supply must not only be stopped but the rate of fuel supply is already excessive and must be cut down. This also is accomplished by relay 121, which upon energization as described above completes an energizing circuit for the field winding 111 of the motor 110, the circuit being completed from side 97 of the power line over conductors 98 and 122, armature 123 and its front contact, conductor 124 and through the field winding 111 and armature winding 106 to the return circuit over conductors 107 and 108 as described above, to the side 103 of the power circuit. The current flowing through the field winding 111 rotates the motor in the opposite direction from that described above when the current flowed through field winding 104. This rotation moves the fuel valve toward the closing position and decreases the rate of fuel supply to the furnace.

As will be clear, the rate of decrease of fuel supply should be considerably less when the temperature is still considerably off normal than when the temperature is close to normal, inasmuch as the furnace will continue to require more than enough fuel supply to maintain the normal temperature until this value is reached. Accordingly the contactor 95 can be so arranged on a sloping surface that it is engaged by the galvanometer pointer for longer intervals of time when it is further removed from the normal and for shorter intervals of time as it approaches the normal position, as will be described in detail in connection with Figure 3. This is exactly the opposite of what has been the practice heretofore of providing for engagement between pointer and periodic table for greater periods of time in accordance with the greater deflection of the pointer from the neutral position.

The energization of relay 121 also completes an energizing circuit for the field winding 117 which it will be noted is connected in multiple with field winding 111. The resultant rotation of motor 116 moves the table to the right towards normal. In order therefore to further decrease the rate of fuel supply, the temperature must continue to rise and the pointer 89 to follow the contact 95 towards neutral. As neutral is approached, the pointer 89 and contact 95 engage for longer periods of time reducing the rate of fuel supply in greater amounts.

If the amount of fuel is reduced to such an extent that the temperature fails to reach normal, the galvanometer pointer 89 will not follow contact 95 towards neutral. Pointer 89 again engages the contact 93 completing a circuit for the relay 102 to again operate the field winding 104 producing a motor rotation which again increases the rate of fuel supply.

Inasmuch as the table motor 116 and the valve motor 110 are in parallel, the relative positions of the rotating elements of those motors will correspond approximately at all times in the operation of the control system. When the temperature is departing from normal the motor 110 is operated to a greater extent than it is operated when the temperature returns to normal. Accordingly in order to provide for the difference in the extent of movement of the motor 110 when the galvanometer pointer 89 departs from normal and returns to normal, provision is made for relative adjustment between the movable contacts 95 and 96 and the motor 110. Inasmuch as the table motor 116 has a position corresponding to that of every position of motor 110, the drive between the motor 116 and the movable contacts 95 and 96 is constructed so as to provide for adjustment of the contacts 95 and 96 relative to the motor 116. Such construction is disclosed in Fig. 4 and described hereinafter.

It will be clear from the above that the control apparatus as it now functions divides the rate of fuel supply into two quantities, that necessary to raise the temperature and that necessary to maintain it, and supplies these components to the furnace in accordance with the need.

In the event that the temperature rises above the predetermined value, which may occur due to a decrease in the material being heated or an increase in the quality of fuel being supplied, the opposite control operations occur.

If the necessary change in the rate of fuel supply could be brought about as soon as the change in condition occurred and before the increase in temperature, the temperature could be maintained at the predetermined value by a decrease in the rate of fuel supply of a fixed amount in accordance with the change. Since, however, the operation depends upon a change in temperature before the control apparatus functions, the fuel supply must be reduced by an amount not only sufficient to prevent further increases in temperature, that is, to maintain it at the fixed temperature but also by a further amount to permit the temperature to drop back to the neutral position. There must accordingly be a greater decrease in fuel supply than is necessary to maintain the temperature at the predetermined value.

Upon the first deflection of the pointer 89 to the right in response to a rise in temperature an energizing circuit is completed for the relay 131 over a circuit including the pointer 89, contact 94, armature 132 and its back contact and conductor 133. Energization of the relay 131 completes an energizing circuit for the motor 110 through the field winding 111, the circuit being completed from the side 97 of the power circuit over the conductors 98 and 134, armature 135 and its front contact, conductor 136 through the field winding 111 and armature winding 106 and over the return circuit as traced above. Motor 110 is operated in accordance with this circuit in a reverse direction from that described in connection with the operation when the field winding 104 was energized and the rate of fuel supply is reduced. As long as the temperature continues to rise above the predetermined temperature and the galvanometer pointer continues to move further to the right, the relay 131 will be periodically energized over the circuit traced above and will in turn complete an energizing circuit for the motor 110 as described above to decrease the rate of fuel supply.

Simultaneously a multiple circuit is completed through the field winding 117 and armature winding 118 of the motor 116 which moves the control table carrying the contact 96 to the right as will be described in detail hereinafter. The contact 96 is thus moved in a step by step manner to follow the galvanometer pointer deflection, the distance however, always being less than the extent of pointer deflection.

When the temperature begins to return to the neutral value, the rate of fuel supply, as pointed out above, is less than enough to maintain the temperature at the predetermined value. As the galvanometer pointer 89 moves towards neutral position, it will engage the contact 96 and an energizing circuit is completed for the relay 137 from the side 97 of the power circuit, galvanometer pointer 89, contact 96 through the winding of relay 137 to the opposite side 103 of the power circuit. The relay 137 when it energizes, operates its armature 132 from engagement with its back contact opening the energizing circuit for the relay 131 which thereafter is prevented from energization even though the pointer 89 continues to engage the contact 94. This prevents any further decrease in the rate of fuel supply as soon as the temperature begins to drop as indicated when the galvanometer pointer 89 begins to return to its neutral position. A further result of the energization of the relay 137 is to complete an energizing circuit for the field winding 104 from the side 97 of the power circuit over conductor 134, armature 138, and its front contact, over the conductor 139, through the field winding 104 and armature winding 106, of motor 110 and over the return circuit as traced above. The motor 110 thereupon is rotated in the same direction as in the case of its operation when relay 102 was energized as described in detail above and the rate of fuel supply is increased. This increase is made small so as to permit the temperature to continue to drop until it reaches the predetermined value but sufficient to prevent further temperature drop when the predetermined value has been reached. If the increase in the rate of fuel supply is such as to produce a temperature rise, the galvanometer pointer 89 will engage contact 96 and again energize relay 131 thereby further decreasing the rate of fuel supply as described above.

As in the case of contact 95, it will be obvious that when the galvanometer pointer 89 has deflected a considerable distance from the neutral position due to a considerable rise in temperature above the predetermined value, the correction to the decrease in rate of fuel supply made when contact 96 is engaged should be less in the case when the deflection is large i. e., inversely as the deflection and accordingly contact 96 is arranged on a table sloping in such a direction that the galvanometer pointer 89 engages the contact 96 for a longer period of time when in greater deflected position than when in a position near the neutral position.

It will now be clear from the above description that the apparatus functions in response not only to the deflection of the galvanometer, but also to the direction in which the galvanometer pointer is at the time moving, that is, away from the neutral position or towards neutral position. The rate of fuel supply is divided into two quantities, the one necessary to maintain a predetermined temperature and the other to produce the necessary change in temperature to the normal value.

A further modification of my invention is illustrated in Figure 3 which is provided as in the case of Figure 2 with a set of stationary contacts and a set of movable contacts which follow the deflection of the galvanometer pointer.

As shown, the pointer 146 controlled by the galvanometer (not shown) is connected by means of a conductor 147 to the side 148 of the power circuit. One of the sloping surfaces 149 of the table is connected by means of conductor 150 to the field winding 151 of the motor 152, and the other sloping surface 153 is connected by conductor 154 to the other field winding 155. Motor 152 comprises the armature winding 156 in addition to these field windings. The armature winding 156 is connected to the opposite side 157 of the power circuit. Sloping surfaces 149 and 153 constitute a pair of movable contacts carried by the table which are periodically engaged by the pointer 146 and follow the deflection of the pointer 146 in any well known manner.

A second set of fixed spring contacts 158 and 159 are also periodically engaged by a periodically operating member 189 which is moved to follow pointer 146 when the latter is deflected. Contact 158 is connected by conductor 161 to the field winding 162 of the motor 163 and contact 159 is connected by conductor 164 to field winding 165. Motor 163 comprises in addition to the windings 162 and 165, the armature winding 166.

The motors 152 and 163 are connected through the differential gear mechanism 167 to control the valve 179. Gear mechanism 167 comprises an internal gear 168 rotatably mounted on shaft 169. Gear 168 meshes with a gear 170 carried on and rotatable with shaft 171 connected to the driving member of motor 152. Gear 168 also meshes with an intermediate gear 172 which in turn meshes with gear 173 carried on and rotatable with motor shaft 174, of the motor 163.

A member 175 rotatably mounted on the motor shaft 174 and connected to the shaft of gear 172 carries a sector gear 176 at its end which meshes with a gear 177. A shaft 178 carrying gear 177 and rotatable therewith is connected to the fuel valve 179 for controlling the opening therein in any well known manner.

When motor 152 rotates, it drives gear 170 which in turn through internal gear 168 moves gear 172 about gear 173, the latter remaining stationary. Member 175 carried by gear 172 rotates the sector 176 to vary the fuel valve opening. Similarly when the motor 163 operates to rotate shaft 174, gear 173 is driven and in turn rotates gear 172 around gear 168 which remains stationary. When both motors 152 and 163 rotate in the proper directions, member 175 is moved over an arc which is proportional to the sum of the two motors rotations. If they rotate in opposite directions the member is rotated in proportion to their differences. This arrangement of differential gears is well known in the art and does not need further description.

Motor 152 is a fast operating motor for producing large changes in the valve opening through the gear mechanism 167. Motor 163 on the other hand, is a slow operating motor which produces comparatively small changes. By means of the differential gear the two motors may, as will be clear, either act in adding relation to produce changes in the valve openings or may act in subtracting relation.

While the temperature remains at the normal value and the galvanometer pointer 146 in neutral position is periodically operated, it will, as is clear from Figure 3, operate between the sloping tables 149 and 153 and produce no effect at this time. When, however, a drop in temperature occurs, the galvanometer pointer 146 is deflected to the left and as it is periodically operated, will engage the table 149. A circuit will be thereupon completed from one side of the power circuit over conductor 147, galvanometer pointer 146, sloping table 149, conductor 150, through the field winding 151 and armature winding 156 of motor 152 to the other side of the power circuit. The motor 152 is rotated and functions through the differential gear mechanism 167 to increase the rate of fuel supply by producing a greater opening of the fuel valve 179.

A multiple circuit will at this time also be completed for the motor 186 which drives the table moving it and the sloping sides 149 and 153 and the contact 189, the contact 189 being associated with the table so as to be moved thereby, to the left following the deflection of the galvanometer pointer. If the contact 189 is moved to the left, it engages the stationary contact 158 upon the next periodic operation and completes a circuit for the initial or slow operating motor over a circuit from one side of the power system through the movable contactor 189, stationary contact 158 and conductor 161 to the field winding 162 of the motor 163, armature winding 166 and conductor 191 to the opposite side 157 of the power circuit. The slow operating motor 163 is rotated in a direction so that it is in adding relation with motor 152 further increasing the fuel valve opening and therefore the rate of fuel supply. It will be understood, however, that this operation is comparatively small and produces a comparatively small variation in the opening of the fuel valve 179.

The pointer 146 will now engage the table, however, at a position near the neutral in view of the fact that the table with sloping sides 149 and 153 has followed up the galvanometer pointer deflection and will therefore continue to complete circuits for the motors 152 and 186 to continue to open the fuel valve, and to further move the table towards the galvanometer pointer.

As soon, however, as the galvanometer pointer 146 begins to return to normal due to the fact that the temperature is returning to normal it will, after an interval reach neutral position between the sloping tables 149 and 153. Thereafter as the temperature continues to rise, pointer 146 will engage the table 153 to complete a circuit for the motor 152 through the winding 155 over a circuit from conductor 147 galvanometer pointer 146, table 153, conductor 154 through the field winding 155 and armature winding 156 to the return circuit as traced above and a multiple circuit for motor 186.

The motor now rotates in an opposite direction from that described above to produce the valve opening. Inasmuch, however, as the table is still in deflected position, it will continue to operate contact 189 into engagement with contact 158 so that motor 163 still rotates to open the fuel valve. Motors 152 and 163 are now in subtracting relation so that the full operation of motor 152 is not effective to decrease the valve opening.

When the galvanometer pointer reaches neutral position, this indicates that the temperature has restored to its normal value. At this time, the movable table and contactor 189 has also returned to normal and no further circuits are completed for the motors. If, however, the galvanometer is deflected in either direction, further operations will occur in accordance with deflection as described above.

In response to a rise in temperature above normal, galvanometer pointer 146 will be deflected to the right and will engage table 153 completing a circuit through the field winding 155, of motor 152 and a multiple circuit for motor 186 as traced above.

The operations of the motor 152 now function to decrease the opening of the fuel valve 179 to decrease the rate of fuel supply and at the same time the table is moved to follow the deflection of the galvanometer pointer. The contactor 189, carried by the table, is actuated into engagement with contact 159 completing a circuit for the motor 163 through the field winding 165.

It will be clear from the above description that a selective control of the fuel valve is obtained which distinguishes not only the extent of deflection of the galvanometer pointer 146 but also the direction of its movement towards or from the neutral position. During the period while the galvanometer needle is moving away from neutral, as for example, toward the left, motors 152 and 163 operate in adding relation to increase the fuel valve opening and when the pointer starts towards neutral, these motors act in subtracting relation to decrease the fuel supply. The decrease is thus smaller than the increase was.

As will be clear to those skilled in the art, any form of control may be employed in carrying out the various forms of invention hereinbefore described. The usual straight on and off control may be employed for carrying out the invention shown in Figure 1.

Although there are many well known controllers which may be employed in carrying out my invention shown in Figure 2, I have disclosed a preferred controller therefor as shown in Fig. 4 in which the contacting control galvanometer 1 comprises a movable coil 88 suspended between the poles of a permanent magnet 3 as described in connection with Figure 1. Secured to the coil 88 is a pointer 89 which is preferably provided with a downwardly extending portion 194 adapted to swing in front of a graduated scale 195 to indicate a deviation of the pointer from normal in the operation of the instrument. The pointer 89 is provided with a contact actuating extension 196 which is adapted to coact with contact carrying springs 197 and 198. Secured to the springs 197 and 198 are the movable contacts 95 and 96 respectively. The table 203 is rigidly supported from and movable with a supporting arm 204, which may be provided with an upwardly extending pointer extension coacting with the scale 195. The arm 204 is secured to and rotatable with vertical spindle 205. Springs 206 and 207 normally maintain the member 204 together with contact table 203 in a central position. The spindle 205 is driven by a gear 206' as will more fully hereinafter appear.

The pointer 89 is periodically lowered and raised under the control of a depressor bar 207' which is pivotally supported above the pointer by the pivots 208 in any suitable manner and is actuated by a vertically slidable rod 209 suitably guided at 210. The member 209 is actuated in its vertical movement by means of cam 211 against which the lower end thereof is held due to the weight of the parts or a light spring may be provided to hold the end of member 209 against the cam 211 if desired.

The cam 211 is mounted on a shaft 212 which is driven by the galvanometer actuated motor 213. During operation, the shaft 212 is continuously driven by motor 213 to periodically raise and lower the pointer which will accordingly actuate one of the contacts into engagement with the controls on table 203, depending upon whether the pointer 89 is deflected to the right or left or is at its neutral position. Although in this form the pointer is rocked, it will be understood that if preferred, the table may be moved to and from the pointer instead. Mounted on the shaft 212 is a cam 213' which actuates an arm 214 pivotally supported at 215 with one end thereof preferably held in engagement with the cam 213' by means of a spring 216. The opposite end of arm 214 is pivotally connected at 217 to a vertically extending link (not shown) which in turn is pivotally connected at 219 to a collar member 220. Secured to and rotatable in the collar member 220 is an escapement gear member 222 to which are secured the gears 223 and 224 adapted to mesh with the gear 206 and to drive the contact table. The gear 206 and the gears 223 and 224 are separated as shown and are mutilated by removing alternate teeth in each gear so that as the cam 213' oscillates or shifts gears 223 and 224 alternately into engagement with the gear 206', the springs 206 or 207 will cause the contact table to be stepped backwards by an amount equal to the distance of one tooth for each reciprocation of the member 213'. This is effected by removing the alternate teeth in such a manner from the gears 223 and 224 that the teeth on the gear 223 will be in line with the points where the teeth have been removed from the gear 224. The member 220 is keyed to and slidably mounted upon the shaft 218 so that as the shaft is rotated, the gears will be driven to shift the contact table and as the member 220 slides vertically due to the motion of the cam 213', the contact table will be permitted to step backward to zero position one step for each movement of member 220.

As hereinbefore pointed out in connection with Fig. 2, in order to provide for a greater movement of motor 110 while the galvanometer pointer is departing from normal, than that movement which is made by motor 110 while the galvanometer pointer 89 is returning to normal, it is necessary to provide for movement of the table carrying the movable contacts 95 and 96 relative to the motor 116. The operation of the ratchet mechanism composed of the gears 206', 223 and 224, and associated mechanism, by the motor 213, upon each depression of the galvanometer pointer, allows the table and movable contacts carried thereby to return toward normal by a movement relative to the table motor 116, the extent of which is determined by the step taken by gear 206' when the gears 223 and 224 are oscillated relative thereto.

The shaft 218 is driven by a worm gear 230 which in turn is driven by a worm 231 suitably mounted on a shaft 233. The shaft 233 is driven by a worm wheel or spiral gear 234 which in turn is driven by a worm or spiral gear 235 driven by motor 116.

In addition to the movable contacts 95 and 96, the pointer 89 also coacts with stationary contacts 93, 92 and 94 supported from the framework (not shown) in any well known manner. These contacts are shown in Figure 2 and their function has been fully described in the above.

A form of controller which may preferably be employed in carrying out the invention shown in Figure 3 is disclosed in Figure 5 in which the controller embodies the galvanometer coil and pointer 146 in operative relation therewith, as described in connection with Figure 3. Pointer 146 is periodically depressed by rail 251 mounted in such a manner that it normally tends to move downward under the action of gravity during which it depresses the galvanometer pointer 146. Rail 251 is supported on the outer ends of arms 252, the inner ends of which are rigidly secured to the shaft 259 which is oscillated by any suitable mechanism (not shown).

Associated with the pointer 146 is a control table 261 which is slidably and pivotally supported on a rock shaft 262 suitably journaled in the instrument frame work (not shown). The control table 261 is freely rotatable on the rock shaft 262 and may be adjusted longitudinally of the latter in response to deflections of the pointer 146 as hereinafter explained. At its front end the control table 261 is provided with an upturned contacting portion 263 for engaging the pointer 146. The upper edge of portion 263 is formed in steps which may be regularly arranged as shown, or any suitable stepped or sloping arrangement thereof may be employed to permit the desired variable movement of pointer 146 when a temperature change occurs.

The control table 261 is periodically oscillated to lift the portion 263 and to contact the upper edges thereof with the pointer 146 by an actuator in the form of a bar 264 co-acting with a tail portion or extension 265 of the table 261. Bar 264 extends parallel to the shaft 262 and is supported on the outer end of arms 265' rigidly secured to and rotatable with rock shaft 262. Secured to the shaft 262 is a lever 266 provided with an end projection 267 in engagement with the surface of cam 268 turning shaft 262 in a counter-clockwise direction under control of cam 268. It will accordingly be seen that table 261 is connected to rock shaft 262 for counter-clockwise movement under control of cam 268 by means of extension 267 of bar 266 and the counter-clockwise turning movement of the rock shaft 262 and table 261 under influence of cam 268 and weight 271 is arrested by the engagement of contacting portion 263 with the galvanometer pointer 146. The angular position of the rock shaft 262 when its motion is thus interrupted determines which of the control contacts 149 and 153 is to be engaged by the control contact 272 and also determines the duration of such engagement.

In the form of mechanism illustrated, the means whereby the position of the rock shaft 262 determines the control contact engagement includes a selector member comprising a bar 273 carried by arms 274 mounted on shaft 262 in any well known manner. This connection rotates the selector member with shaft 262 but yields to permit said selector member to be held stationary when it is operatively engaged by the separated sloping control sections 275 and 276.

The contact actuating levers 277 and 278 are mounted on and depend from stationary shaft 279 and carry at their lower ends adjustable contact engaging parts 281 which force the contacts 149 and 153 respectively into engagement with contacts 272 mounted on the contact carrier 282 which is pivotally mounted on shaft 283. Each of the contact engaging parts 281 cooperates with a spring supporting member 284 shaped to normally hold the contacts 149 and 153 disengaged from the cooperating contacts 272 which are periodically shifted to engage the selected contact 149 or 153 at a point in its cycle of operation determined by the position of bar 274. Contacts 272 are periodically moved toward the contacts 149 and 153 by means of a lever 286 fulcrumed on the shaft 279 and engaging the upper side of the cam 268. A latch 287 is pivotally connected at one end 288 to the lower portion of the lever 286 the other end of said latch being slidably connected to the contact carrier frame 282 at 289. The lower edge of the latch 287 has formed thereon the cam surface 291 which rides on the rod 292. As the lever 286 is turned counter-clockwise by the cam 268, the latch 287 causes the contact carrier frame 282 to swing about the shaft 283 moving contacts 272 towards contacts 149 and 153 to be engaged by one or another of these bar contacts as described above. The parts are so relatively arranged and timed that the levers 277 and 278 are held out of position to engage the selector bar 273 during the periods in which the rock shaft is rotating. The details of the contact operation are fully disclosed in co-pending application Ser. No. 198,298 filed June 11, 1927, to which reference may be had for a more detailed disclosure thereof.

As will more fully appear from said co-pending application, the bar portion 273 of the selector serves as a stop against which the serrated sloping control sections of one or both of the levers 277 and 278 may bear so that one or the other of the levers is prevented from moving their corresponding contact 272 and the position of engagement of the contacts is predetermined while at the same time the other lever may or may not be held at a predetermined distance away therefrom. The particular lever 277 or 278 thus held in predetermined operative position controls the point of engagement of the selected contact 149 or 153 with the contact 272 in the cycle of movement of contact 272 while the disengagement of the contacts occurs invariably at the end of a cycle of periodic operations of the mechanism. When the bar 273 is in the position in which the shaft 262 is arrested by the engagement of the pointer 146 with the control table 261 at the low side of the neutral point of the control table, the lever 277 engages the bar 273 and the lever 277 is thereby prevented from moving the contact into operating position and contact 149 is permitted to move to engaging position. Similarly on deflection of the pointer 146 to the high side of the neutral point of the control table 261, the bar 273 is in position to be engaged by the lever 278. The lever 273 is therefore free to move its contact 153 to engage contact 272.

In operation, the position of the control table 261 longitudinally of the rock shaft 262 depends upon the deflecting pointer 146 and the means by which the adjustment of table 261 longitudinally of the shaft 262 is effected, comprises a carriage 301 mounted on shaft 302 and provided with a projection 304 and entering a helical groove 135 formed in shaft 302. Carriage 301 is provided with an extension carrying apertured ears 305 located at opposite sides of the table 261, and through which the shaft 262 extends. In consequence, the table 261 is shifted longitudinally of shaft 262 by motor 186 suitably supported on the frame work (not shown) which when energized, functions through chain 306 and sprockets 307 and 308 to rotate the shaft 302 in a direction depending on the galvanometer pointer deflection, as described hereinbefore.

Secured to the end of shaft 302 opposite sprocket 308 and driven thereby is a disk 311 with spiral grooves 312 and 313 which merge into each other at 314. A switch lever 315 projecting from an arm 318 pivoted at 316 is provided with an actuated pin 317 riding in grooves 312 and 313. Secured to extension 319 of the arm 318 is a contact carrying member 320 carrying contactor 189 for engaging contacts 158 and 159.

With the mechanism in neutral position, the lever 315 is so positioned that neither of the sets of contacts 158 or 159 is in engagement with contact 189. Rotation of the shaft 302 as described above in one direction will, however, close contacts 189 and 158 whereas rotation of the shaft in the opposite direction will close contacts 189 and 159.

If desired, this pair of stationary contacts 158 and 159 may be carried by and insulated from the rail 251 at some distance from neutral position. In that case, when the pointer 146 is in deflected position, it will periodically engage one or the other of these contacts as the rail 251 is depressed.

Suitably supported from the framework of the mechanism (not shown) are sets of contacts 321 and 322 in the path of movement of extension 301 of the table 261. As the table 261 reaches its limit of movement to the left, contacts 321 will be opened by engagement with extension 265. Similarly, upon movement of the table to its right limit, contacts 322 will be disengaged.

The operation of the mechanism disclosed in Figure 5 for carrying out operations described in connection with Figure 3 will now be evident from a brief summary. In operation, shafts 262, and 259 are driven from a common motor (not shown) and bails 251 and 264 are periodically raised and lowered to periodically depress the galvanometer pointer 146 and to raise table 261 as will appear from said co-pending application. When the pointer 146 is not deflected, table 261 will be in the neutral position shown, lever arm 315 will be positioned to maintain its contacts disengaged and as table 261 is raised and lowered, the movement of bar 274 is such that neither of its contacts are positioned to be engaged by contact 272.

If now pointer 146 deflects from its neutral position sufficiently upon the next upward periodic operation of the table 261 pointer 146 will be positioned to be engaged by a different step of contacting member 263, and the table together with shaft 262 and bar 274 will be arrested in position to cause engagement of contact 272 with contact 149 or 153 depending upon the direction of deflection of pointer 146 to complete a circuit for the fuel valve motors 152 and 186 and to close contact 189 and 158 for motor 163. As long as the pointer is off normal, the circuit over either contact 158 or 159 will close as described above and as soon as the pointer and table are restored, the circuits are opened.

For convenience, the control systems herein disclosed which embody the principles, features and advantages of this invention, have been described, as an example, as applied to a heat transfer device; the controllable or controlling variable being selected as a temperature, as an example; and the control or operating condition by which the heat transfer device is adjusted to maintain the temperature or controllable condition to normal, has been described, as an example, as the heat supply or the fuel supply. Obviously the operation of the control methods and systems disclosed herein, which are embodiments of this invention, are in no way dependent upon their application to heat transfer devices in order that they may be made use of. There are many other types of industrial process and apparatus than the heat transfer devices which may be controlled by control systems made according to this invention. In order to apply the control systems of this invention it is only necessary that the process and apparatus to which it is applied, be such that there be a variable physical condition which may be termed the controlling or controllable condition, the magnitude and variations of which may be measured by any measuring device; and that the process and apparatus in question have an operating condition which may be termed the controlled condition which is adjustable by any of the multitude of devices available for adjusting industrial apparatus and processes. In the specific example herein employed, for convenience in the description of the invention, namely, a heat transfer device, the controllable or controlling variable is a temperature associated with the heat transfer device and the measuring device is a thermocouple and its associated circuit for operating the galvanometer. On the other hand in the heat transfer device herein disclosed, as an example, the operating condition or controlled condition is the fuel or the heat supplied to the heat transfer device, and the controlling mechanism for adjusting the fuel is disclosed by way of example, as a valve.

Obviously the system and method of control of the present invention may be applied to industrial processes and apparatus in which the controlling or controllable variable may be, for example, speed, pressure, volume, weight, density, $CO_2$ content of gases, hydrogen ion concentration, electrical potential, electrical current density, degree of superheat, and any of the other multitude of variable conditions associated with industrial processes and apparatus which it may be desirable to control. Measuring devices responsive to such controllable or controlling conditions such as tachometers, pressure gauges, flow meters, balances, $CO_2$ meters, voltmeters, ammeters, potentiometers, et cetera, are well known to the art and can be caused to operate a galvanometer pointer or similar deflecting member. Various controlled or operating conditions associated with industrial processes and apparatus, such for example as valve position, electrical potential, electrical current density, flow of fluids, link mechanisms, differential mechanisms, etc., which may be operated by any of the usual sources of power such as electrical motors, gas engines, internal combustion engines, etc., may be employed in connection with control systems made according to this invention. In other words, invention lies in the control system disclosed herein, and is in no way necessarily dependent upon a particular process or industrial apparatus controlled, or the particular controlling condition, or the particular controlled condition involved.

Although I have described my invention in connection with a preferred embodiment thereof, it will be clear that the general principles of operation are applicable to other forms of control mechanism for control of any physical condition and I do not intend to limit myself to the specific adaptations disclosed herein but only insofar as set forth in the appended claims.

Claims:

1. In a control system for heat transfer devices in which the heat supply is variable, a temperature responsive device, a galvanometer having a deflecting member normally in a neutral position, means for periodically engaging said deflecting member, the deflections of said member being in accordance with the variations in temperature from a fixed normal temperature corresponding to said neutral position to which said device responds, mechanism including said periodic means cooperating with said deflecting member while deflected and moving away from a neutral position for varying said heat supply in a predetermined manner in accordance with the extent of deflection, and means cooperating with said mechanism to vary said fuel supply in the opposite manner while said member is moving towards neutral position.

2. In a temperature control system, a galvanometer, a deflecting member therefor having neutral and deflected positions, said deflecting member being responsive to variations in a temperature from a predetermined value, a first set of stationary contacts, a periodic means for engaging said deflecting member with said stationary contacts when it moves from its neutral position, a second set of movable contacts, responsive to the deflection of said deflecting member for following said deflecting member, said deflecting member being arranged to engage said movable contacts when moving toward its neutral position and an electric circuit controlled by the engagement of said deflecting member with said movable contacts.

3. In a temperature control system, a source of heat supply, a galvanometer and a deflecting member responsive to various changes in a temperature from a predetermined value, a periodically operating means, a pair of stationary contacts, said periodically operating means engaging said member with said stationary contacts when said member is in a deflected position, an electric circuit controlled by said engagement for varying the heat supply to restore the temperature being controlled, a pair of movable contacts arranged to move in the direction of said deflecting member, said deflecting member being arranged to engage said movable contacts when it is moving toward its neutral position and an electric circuit controlled by said engagement with the movable contacts for varying the heat supply in accordance with the extent of variation of said deflecting member, but in the opposite direction from the variation produced by the engagement of said pointer with said first mentioned contacts.

4. In a control system, a galvanometer having a deflecting member, a set of stationary contacts, a second set of contacts, periodic means for causing said deflecting member to selectively engage said first and said second set of contacts and a differential motor, selectively controlled by said deflecting member when engaging said contacts.

5. In a temperature control system, a temperature responsive element, two electric motors, electrical connections between the temperature responsive element and said motors for operating both of said motors upon a predetermined departure of the temperature from normal and for reversing one of said motors when the temperature approaches normal.

6. In a temperature control system, means responsive to the temperature to be controlled comprising a galvanometer having a deflecting needle, three contacts cooperating with said needle, two electric motors for controlling the supply of temperature changing medium, means responsive to engagement between the needle and one of said contacts for starting both of the motors and means responsive to the engagement between said needle and another of said contacts for reversing one of said motors.

7. In a temperature control system, a temperature responsive means having a deflecting member, a high temperature contact, a low temperature contact and a neutral contact cooperating with said deflecting member, two electric motors for controlling the supply of temperature changing medium, means responsive to engagement between said needle and said high temperature and low temperature contacts for operating both of said motors to decrease and increase, respectively, the rate of supply of temperature changing medium and means responsive to engagement of said needle with said neutral contact for reversing one of said motors.

8. In a temperature control system, a needle responsive to variations in temperature, a high temperature contact, a low temperature contact and a neutral contact associated with said needle for cooperation therewith, two electric motors for controlling the rate of supply of a temperature changing medium, means whereby engagement of the needle with the neutral contact while the needle is moving from the high contact toward the neutral contact operates one of said motors in one direction and means whereby engagement of said needle with said neutral contact while said needle is moving from said low temperature contact toward the neutral contact operates the same motor in the reverse direction.

9. In a temperature control system, means responsive to variations in temperature, a high temperature contact, a low temperature contact and a neutral contact, two electric motors adapted to control the rate of supply of a temperature changing medium, three relays, electrical connections between the said relays and said contacts and said motors whereby energization of the first relay operates said motors to reduce the rate of supply of temperature changing medium, energization of the second of said relays operates both of said motors to increase the rate of supply of temperature changing medium and energization of the third relay reverses the direction of rotation of one of said motors.

10. In a temperature control system, a deflecting member responsive to variations in temperature from a predetermined value, a periodic operating means, a pair of stationary contacts, said periodic operating means intermittently forcing said deflecting member into engagement with one of said stationary contacts when said member is in a deflected position, an electric motor operating when said deflecting member engages one of said stationary contacts to vary the rate of supply of temperature changing medium so as to restore the temperature to normal, a pair of movable contacts, means for moving said contacts in the direction of movement of said deflecting member and a second electric motor operating when said deflecting member engages one of said movable contacts for further varying the rate of supply of temperature changing medium.

11. The method of control involving a regulator and a control instrument having a normal, which comprises making a predetermined adjustment of the regulator in response to a departure from normal of the control instrument, the direction of the predetermined adjustment being in accordance with the direction of departure from normal of the control instrument, making an adjustment of the regulator annulling the said predetermined adjustment in response to a return to normal of the control instrument, and adjusting the regulator in a relatively continuous manner in a direction corresponding to the direction of departure from normal of the control instrument so long as the control instrument remains off-normal.

12. The method of control involving a regulator and a control instrument having a normal, which comprises making an adjustment in the regulator in accordance with the extent of departure of the control instrument from normal, making an adjustment in the regulator annulling the first mentioned adjustment in response to the return of the control instrument to normal, and making an adjustment in the regulator the extent of which is in accordance with the extent and direction of departure of the control instrument from normal and independent of the trend of the control instrument with respect to normal.

13. A control system having a measuring device, a set of movable contacts engageable by said measuring device, means for moving said movable contacts in response to variations of the measured quantity, a set of stationary contacts, means associated with the set of movable contacts for engaging said set of stationary contacts, a control means operated by engagement of the measuring device and movable contacts, another control means operated by engagement of said means associated with the set of movable contacts with the stationary contacts.

14. A control system having a measuring device a first set of contacts, a second set of contacts, said sets of contacts being relatively movable, said first set of contacts being engageable by said measuring device, means operable by engagement of said measuring device with said first set of contacts for adjusting the relation between said sets of contacts, contacting means associated with said first set of contacts for engaging said second set of contacts, a first control mechanism operable by engagement of the measuring device with the first set of contacts, and a second control mechanism operable by engagement with said contacting means with said second set of contacts.

15. A control system having a measuring device, a first set of contacts, a second set of contacts, said sets of contacts being relatively movable, said first set of contacts being engageable by said measuring device, means operable by engagement of said measuring device with said first set of contacts for adjusting the relation between said sets of contacts, contacting means associated with said first set of contacts for engaging said second set of contacts, a first control mechanism operable by engagement of the measuring device with the first set of contacts, and a second control mechanism operable by engagement with said contacting means with said second set of contacts, said first control mechanism operating in accordance with the direction and extent of change of the measuring device relative to the first set of contacts.

16. A control system having a measuring device, a first set of contacts, a second set of contacts, said sets of contacts being relatively movable, said first set of contacts being engageable by said measuring device, means operable by engagement of said measuring device with said first set of contacts for adjusting the relation between said sets of contacts, contacting means associated with said first set of contacts for engaging said second set of contacts, a first control mechanism operable by engagement of the measuring device with the first set of contacts, and a second control mechanism operable by engagement with said contacting means with said second set of contacts, said first control mechanism operating in accordance with the direction and extent of change of the measuring device relative to the first set of contacts, said second control mechanism operating in accordance with the relative positions of the first set of contacts and the second set of contacts.

17. A temperature control system having a temperature responsive deflecting member, a set of stationary contacts, a set of movable contacts, means for engaging said deflecting member with said movable contacts, means for moving the set of movable contacts in response to movements of the deflecting member, a contactor positioned relative to the set of stationary contacts in accordance with the position of the set of movable contacts, means for engaging the contactor with the stationary contacts, at least two power devices, at least one power device being controlled by engagement of the deflecting member with the movable contacts, at least one of said power devices being controlled by engagement of the contactor with the stationary contacts.

18. A temperature control system having a temperature responsive deflecting member, a set of stationary contacts, a set of movable contacts, means for engaging said deflecting member with said movable contacts, means for moving the set of movable contacts in response to movements of the deflecting member, a contactor positioned relative to the set of stationary contacts in accordance with the position of the set of movable contacts, means for engaging the contactor with the stationary contacts, at least two power devices, at least one power device being controlled by engagement of the deflecting member with the movable contacts, at least one of said power devices being controlled by engagement of the contactor with the stationary contacts, and mechanism operated by the power devices to algebraically combine the movements thereof.

19. An automatic control system having a deflectable member, a normal control device arranged for selective operation by the member when in neutral position, a high control device arranged for selective operation by the member when in up-scale position, a low control device arranged for selective operation by the member when in down-scale position, a regulator having two degrees of regulation, means including the high control device for operating the regulator to one degree of regulation, means including the low control device for operating the regulator to the other degree of regulation, means including the normal control device for operating the regulator from one to the other of said degrees of regulation upon the first actuation of the normal control device following actuation of a high or low control device.

20. An automatic control system having a deflectable member, a normal control device arranged for selective operation by the member when in neutral position, a high control device arranged for selective operation by the member when in up-scale position, a low control device arranged for selective operation by the member when in down-scale position, a regulator having two degrees of regulation, means including the high control device for operating the regulator to one degree of regulation, means including the low control device for operating the regulator to the other degree of regulation, means including the normal control device for operating the regulator from one to the other of said positions of regulation upon the first actuation of the normal control device following actuation of a high or low control device, an additional regulator, means including the high control device for operating the additional regulator so long as the high control device is operated, means including the low control device for operating the additional regulator so long as the low control device is operated, said additional regulator being non-operative when the normal control device is operated.

21. An automatic control system having a deflectable member, a normal control device arranged for selective operation by the member when in neutral position, a high control device arranged for selective operation by the member when in up-scale position, a low control device arranged for selective operation by the member when in down-scale position, a regulator having two degrees of regulation, means operated by actuation of the high control device by said member for adjusting said regulator to one degree of regulation, means operated by actuation of the low control device by said member for adjusting the regulator to the other degree of regulation, and means operated by the first actuation of said normal control device following actuation of either a high or low control device for altering the immediately previous degree of regulation to the other degree of regulation.

22. An automatic control system having a deflectable member, a normal control device arranged for selective operation by the member when in neutral position, a high control device arranged for selective operation by the member when in up-scale position, a low control device arranged for selective operation by the member when in down-scale position, a regulator having two degrees of regulation, means operated by actuation of the high control device by said member for adjusting said regulator to one degree of regulation, means operated by actuation of the low control device by said member for adjusting the regulator to the other degree of regulation, means operated by the first actuation of said normal control device following actuation of either a high or low control device for altering the immediately previous degree of regulation to the other degree of regulation, an additional regulator, means including the high control device for operating the additional regulator so long as the high control device is operated, means including the low control device for operating the additional regulator so long as the low control device is operated, said additional regulator being non-operative when the normal control device is operated.

23. An automatic control system having a control instrument provided with high, normal, and low positions of control, a regulator having two widely separated positions of regulation and the capacity for gradual adjustment, means including the control instrument and operative when the control instrument is in high control position for maintaining said regulator in one of said two positions of regulation and for gradually operating the regulator in one direction, means including the control instrument and operative when the control instrument is in low control position for maintaining said regulator in the other of said two positions of regulation and for gradually operating the regulator in the opposite direction, means including the control instrument and operative when the control instrument is in normal control position for changing the regulator from the last position of regulation determined by which of the high and low control positions were last occupied by the control instrument to the other position of regulation.

24. An automatic control system having a control instrument provided with high, normal, and low positions of control, a regulator having two widely separated positions of regulation and the capacity for gradual adjustment, means including the control instrument and operative when the control instrument is in high control position for maintaining said regulator in one of said two positions of regulation and for gradually operating the regulator in one direction, means including the control instrument and operative when the control instrument is in low control position for maintaining said regulator in the other of said two positions of regulation and for gradually operating the regulator in the opposite direction, means including the control instrument and operative when the control instrument is in normal control position for changing the regulator from the last position of regulation determined by which if the high and low control positions were last occupied by the control instrument to the other position of regulation, the last mentioned means being non-operative to gradually adjust the regulator.

25. An automatic control system having a control instrument provided with high, normal and low positions of control, a regulator having two widely separated positions of regulation and the capacity for gradual adjustment, means including the control instrument and operative when the control instrument is in high control position for maintaining said regulator in one of said two positions of regulation and for gradually operating the regulator in one direction, means including the control instrument and operative when the control instrument is in low control position for maintaining said regulator in the other of said two positions of regulation and for gradually operating the regulator in the opposite direction, means including the control instrument and operative when the control instrument is in normal control position for changing the regulator from the last position of regulation determined by which of the high and low control positions were last occupied by the control instrument to the other position of regulation, the last mentioned means being non-operative to gradually adjust the regulator, said gradual operation of the regulator being in such direction as to increase the regulating effect associated with the corresponding one of said two positions of regulation.

26. In the operation of a control system comprising a controller having high, normal, and low positions of control, and a regulator having two positions, the method which comprises; always maintaining said regulator in one of said positions when the controller is in high position, always maintaining said regulator in the other position when the controller is in low position, and changing the regulator from the last maintained position to the other position when the controller changes from a high or low position to normal position.

27. In the operation of a control system comprising a controller having high, low, and normal positions of control, and a regulator having capacity for quick adjustment between two widely separated positions of regulation and for gradual adjustment between its limits of possible operation, the method which comprises; maintaining said regulator in one of said positions of regulation and gradually operating said regulator in one direction when the controller is in high position of control, maintaining said regulator in the other of said positions of regulation and gradually operating said regulator in the opposite direction when the controller is in low position, changing the regulator from the last position of regulation to the other position of regulation when the controller changes from a high or low position of control to the normal position of control.

28. In the operation of a control system comprising a controller having high, low, and normal positions of control, and a regulator having capacity for quick adjustment between two widely separated positions of regulation and for gradual adjustment between its limits of possible operation, which comprises; the method which consists in maintaining said regulator in one of said positions of regulation and gradually operating said regulator in one direction when the controller is in high position of control, maintaining said regulator in the other of said positions of regulation and gradually operating said regulator in the opposite direction when the controller is in low position, changing the regulator from the last position of regulation to the other position of regulation when the controller changes from a high or low position of control to the normal position of control, discontinuing the gradual adjustment of said regulator when the controller is in normal control position.

29. In the operation of a control system comprising a controller having high, low, and normal positions of control, and a regulator having capacity for quick adjustment between two widely separated positions of regulation and for gradual adjustment between its limits of possible operation, which comprises; the method which consists in maintaining said regulator in one of said positions of regulation and gradually operating said regulator in one direction when the controller is in high position of control, maintaining said regulator in the other of said positions of regulation and gradually operating said regulator in the opposite direction when the controller is in low position of control, changing the regulator from the last position of regulation to the other position of regulation when the controller changes from a high or low position of control to the normal position of control, discontinuing the gradual adjustment of said regulator when the controller is in normal control position, said gradual operation of the regulator being in such direction as to increase the regulating effect associated with the corresponding positions of control.

ANKER E. KROGH.